United States Patent

Lambert et al.

[15] 3,701,969

[45] Oct. 31, 1972

[54] OPTICAL FAILSAFE AIRPLANE LANDING GUIDANCE SYSTEM

[72] Inventors: Robert E. Lambert, Hazardville; Edward W. Beal, Wethersfield; Anthony J. Bacewicz, East Hartford, all of Conn.

[73] Assignee: Connecticut International Corporation, Windsor Locks, Conn.

[22] Filed: July 13, 1971

[21] Appl. No.: 162,131

[52] U.S. Cl. ............................... 340/25, 200/61.52
[51] Int. Cl. ............................. B64f 1/18, G08g 5/02
[58] Field of Search............. 200/61.49, 61.50, 61.51; 340/25, 26, 24; 240/1, 2

[56] References Cited

UNITED STATES PATENTS

| | | | |
|---|---|---|---|
| 1,175,062 | 3/1962 | Johnson | 200/61.52 |
| 3,012,224 | 12/1961 | Ferguson | 340/26 |
| 3,091,751 | 5/1963 | Greenberg | 340/26 |
| 3,457,545 | 7/1969 | Brown | 340/25 |
| 3,597,753 | 8/1971 | Tabankin | 200/61.52 |

*Primary Examiner*—Kathleen H. Claffy
*Assistant Examiner*—Thomas L. Kundent
*Attorney*—John M. Prutzman et al.

[57] ABSTRACT

An optical failsafe airplane landing guidance system is disclosed. A pair of lights are placed longitudinally relative to each other along a runway and emit light beams pointed upwardly and parallel to the runway define the vertical boundaries of a safe landing corridor. The lights are connected in series and include a photocell and a bi-stable relay in their control circuit to control the level of light and disable the system when either of the lights is out of adjustment. Each light includes an attitude switch comprising a heavy cylindrical pendulum supported by a stranded cable and positioned in a cup submerged in a viscous liquid, such as an equal mixture of two silicone liquids having centistoke ratings of about a 5 to 1 ratio, having minimum viscosity change over an ambient temperature range of $-65°$ F. to $+130°$ F. The cylindrical pendulum is spaced from the cup by an annulus which forms a hydraulic orifice in which the ratio of the diameter of the cylindrical to the width of the orifice is about 10 to 1 so that the pendulum is vibration insensitive and the switch will not close under low frequency vibrations having a double amplitude of about 10 times the maximum allowable misadjustment acceptable for landing guidance.

12 Claims, 4 Drawing Figures

PATENTED OCT 31 1972

INVENTORS
ROBERT E. LAMBERT
EDWARD W. BEAL
ANTHONY J. BACEWICZ

BY
ATTORNEYS

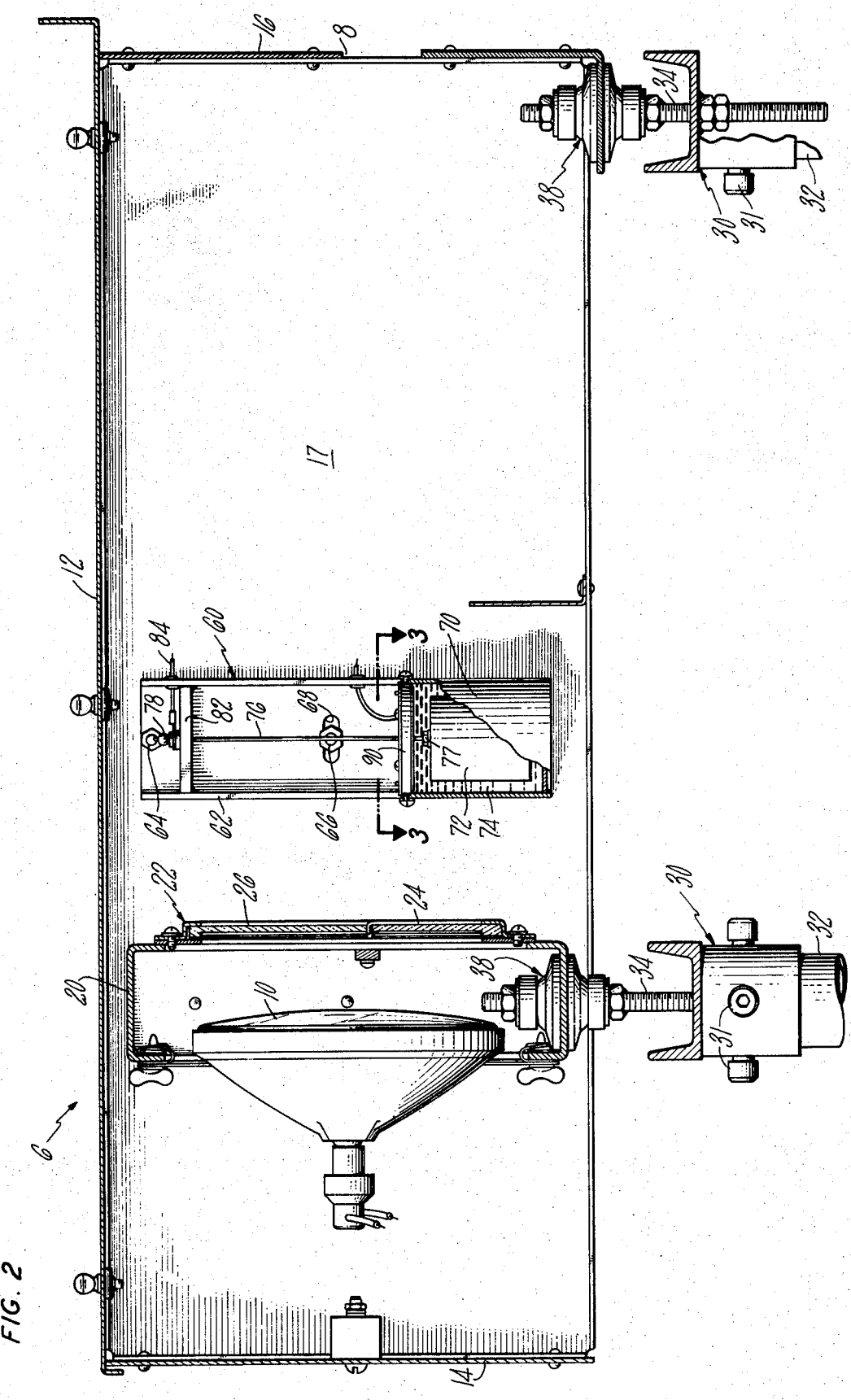

3,701,969

OPTICAL FAILSAFE AIRPLANE LANDING GUIDANCE SYSTEM

This invention relates in general to airplane landing guidance apparatus and in particular to failsafe apparatus for enabling the pilot of an aircraft approaching an airport runway to determine the proper glide slope to enable him to touch down safely at the prescribed point on the runway.

During the approach of an airplane to a runway for landing it is essential that the pilot maintain the airplane at the proper glide angle to reach the intended point of touchdown on the runway at the desired landing speed. This glide path must be maintained substantially constant within relatively narrow limits and the glide path must be measured with respect to the point of expected touchdown. Any material deviation from such a glide path may either cause the point of actual touchdown of the airplane on the runway to be short of the desired point of touchdown to result in a danger of striking an obstruction beyond the end of the runway or to be so far down the runway as to leave inadequate room for stopping.

The well-known instrument landing system (ILS) enables the pilot of an airplane to maintain his craft on the proper approach path by appropriate radio beams transmitted from the ground. In addition, some airports are equipped with ground-controlled approach (GCA) equipment so that the position of the craft and its glide angle are presented on a screen visible to the control tower operator who may then talk the pilot down if the need arises.

Both of the foregoing techniques, however, require the presence on the ground of elaborate and expensive equipment, and the ILS system additionally requires the presence in the airplane of expensive radio receiving apparatus which adds weight to the plane. Moreover, many of the smaller public airports and virtually all of the private airports are equipped with neither of these landing aids. Furthermore, a number of the smaller airplanes are not equipped with ILS apparatus.

Although choosing and flying the proper approach path presents no particular problem to the skilled pilot under visual flying conditions, nighttime landings and other periods of poor visibility present a very real hazard for a pilot whose plane is not equipped with ILS or who is landing at an airport having neither ILS nor GCA equipment. The magnitude of this hazard is increased where the pilot is landing at a field having no runway lighting of having relatively rudimentary lighting.

While various apparatus have been devised to cause the pilot to see illumination of differing patterns and/or colors depending upon his position relative to the desired approach path, these apparatus have not met the required standards of safety since there has been no foolproof assurance that they were performing properly whenever operating.

It is the object of the present invention to provide a solution to these problems in an inexpensive failsafe runway glide path guidance system in which the pilot can have complete confidence.

Other objects will be in part obvious and in part pointed out in more detail hereinafter.

In the drawings:

FIG. 2 is a cross-sectional view of one of the light fixtures used in the system of FIG. 1;

Figure 1:
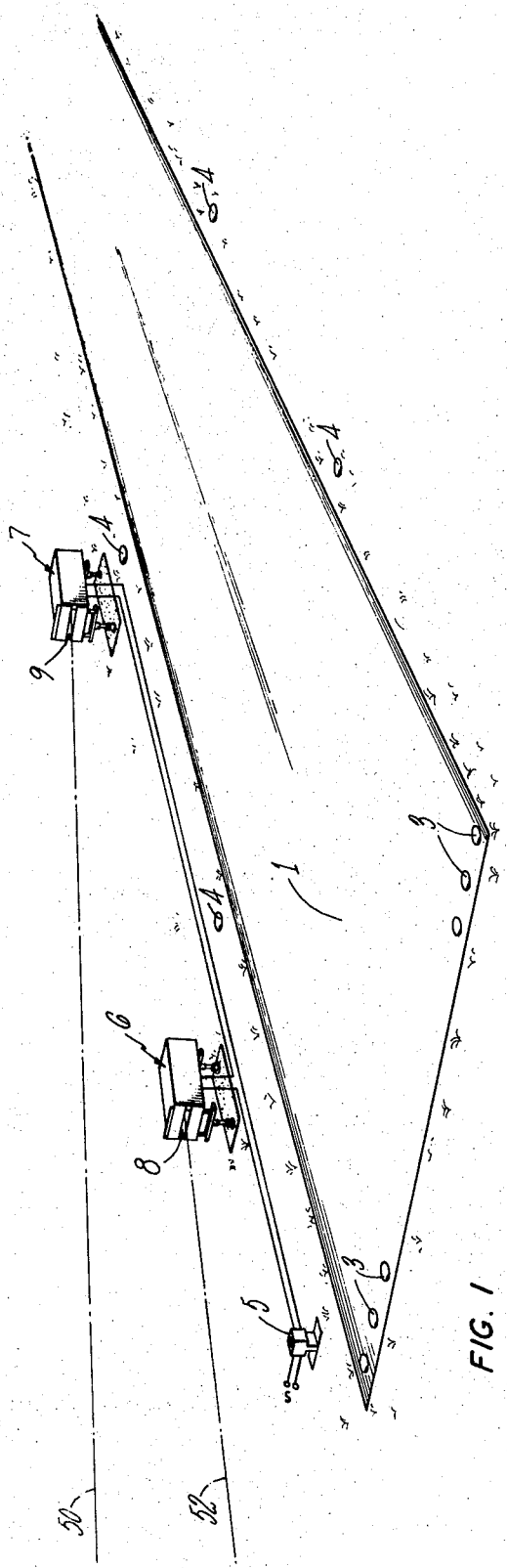
FIG. 1 is a fragmentary perspective view of an airport runway equipped with the glide path guidance system of this invention.
Figure 3:
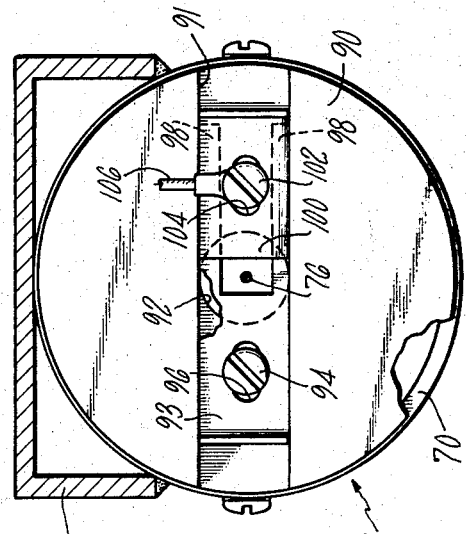
FIG. 3 is an enlarged cross-sectional view taken along the line 3—3 of FIG. 2.
Figure 4:
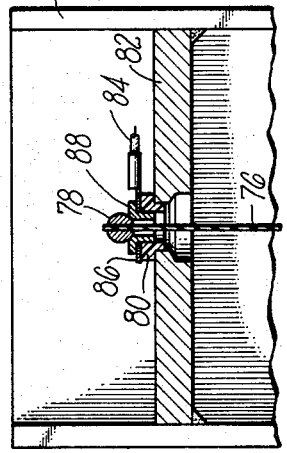
FIG. 4 is a fragmentary cross-sectional view of the mounting portion of the tilt switch incorporated in the light fixture of FIG. 2.

Referring now to the drawings in detail, there is shown a runway 1 having threshold lights 3 at its end and edge lights 4 at its sides. A pair of identical light beam generators, or glide path guidance light fixtures, 6 and 7 are provided at one side of the runway as hereinafter more fully described. As shown, the light fixtures 6 and 7 are connected in series with each other and with a photocell actuated control 5 which controls the light output of the light fixture to provide a higher light intensity when the ambient level of light is higher than when it is below a pre-set level.

The downwind light fixture 6 and the upwind light fixture 7 are spaced apart along the side of the runway a fixed distance of, say, 300 to 500 feet and are provided with horizontally disposed rectangular apertures 8 and 9 respectively to emit light beams which are pointed parallel to and are angled upwardly from the runway to define therebetween the vertical boundaries of a safe landing corridor set at the desired slope angle to furnish the pilot with visual approach slope and point of touchdown information for a safe descent guidance.

The light fixtures 6 and 7 are identical and will be described in conjunction with light fixture 6 shown in FIG. 2. Light fixture 6 comprises pre-focused lamp 10 fixedly mounted in a elongated rectangular housing having a top cover 12, a rear panel 14, and a front panel 16 to provide the lamp with shelter from the elements. The horizontally disposed rectangular aperture 8 provided by front panel 16 is aligned with the light beam generated by the lamp 10. Lamp 10 is fixedly mounted on an optical mounting frame 20 which provides a lens support structure 22 to support a pair of filter lenses 24, 26 to intercept the light emitted by the lamp 10 with the focal point of lamp 10 forward of lens 24, 26. The lower filter lens 24 is white and the upper filter lens 26 is red so that the color of the light visible through the rectangular aperture 8 is dependent upon the line of sight of the viewer and the lens assembly.

Light fixtures 6 and 7 are mounted by a pair of T-bar mounts 30 which telescope respectively over a pair of tubular support legs 32 projecting upwardly from a concrete mounting pad and are locked in place by set screws 31.

Projecting upwardly from each T-bar mount 30 is a pair of adjusting screws 34 by which the lateral axis of the light fixture may be adjusted to a horizontal position and the longitudinal axis adjusted to provide the proper slope angle. The housing for the light fixture is clamped to each adjusting screw 34 by a pair of ball joint clamping members 38 to fix the housing in the desired adjusted position. With this arrangement, the rectangular aperture 8 of the light fixture may be positioned horizontally and the slope angle of the light emitted through the aperture 8 adjusted to the desired angle relative to the horizontal to provide the desired slope angle for the approach of an airplane to the runway.

Returning to FIG. 1, it will be evident that the light beam 50 emitted by upwind light fixture 7 and the light beam 52 emitted by downwind light fixture 6 and will, due to the spacing of the lights 6 and 7 along the runway, provide a safety corridor to guide the decent and point of touchdown of a landing airplane. Such a safety corridor can be visually observed by the pilot who will see white light from downwind light fixture 6 and red light from upwind light fixture 7 when he is in the safety corridor defined by light beams 50 and 52. If the pilot is above the required approach path, both beams will be seen as white light, while a low approach is indicated by both beams appearing red. Any transition from white to red occurs over a sector of about one-half degree where the light beam is pinkish in color.

Because small variations in the glide angle for landing can result in a hazardous condition, it is apparent that, if either light fixture 6 or 7 is out of adjustment as, for example, after being hit by a snowplow, the pilot would be endangered by overshooting or undershooting the desired touchdown point. It is also apparent that, with the light fixtures positioned adjacent to the runway, they are subject to strong vibrational forces due to buffetting by air blasts from airplanes using the runway. Thus it is essential that the lights not operate when they are permanently out of adjustment by even a small amount but are not rendered inoperative when they are subjected to temporary misalignment due to buffetting forces causing vibrations of substantially greater amplitude than the maximum tolerable permanent misadjustment. This invention provides means for achieving these objectives.

As shown in FIG. 2, such means take the form of a pendulum type switch assembly 60 mounted on the side panel 17 of the light fixture. The switch assembly 60 is provided with a channel shaped frame 62 mounted on the side panel 17 by a pair of bolts 64, 66 received in apertures on the frame 62 with the aperture 68 being elongated for the adjustment of the frame 62 relative to the side panel 17. Fixed to the bottom of the frame 62 is a cylindrical cup 70 which surrounds a cylindrical pendulum 72 spaced therefrom by an annulus 74. The cup 70 is filled with a viscous silicon liquid having a minimum viscosity change over an ambient temperature range of −65° F to 130° F.

The pendulum 72 is supported by a multistranded cable 76 engaged in an apertured coupling nut 77 threaded into a mating opening of the cylindrical pendulum 72. The stranded cable 76 is provided with a spherical ball 78 which provides a universal connection with an eyelet 88 to support the pendulum. The eyelet 88 is mounted on a support plate 82 and is electrically isolated therefrom by apertured insulator 80. A pigtailed terminal lead 84 is provided with a terminal 86 against which an eyelet 88 is biased by the weight of pendulum 72 to provide an electrical connection between the ball 78 and the terminal 86.

The cup 70 is provided with an apertured cover 90 and the cable 76 extends through the aperture 92 thereof in spaced relation therewith. In a longitudinal groove 91 of the cover plate 90 is positioned a front contact element 93 adjustably secured by screw 94 passing through elongated aperture 96. The contact element 93 is bifurcated with the legs 98 thereof underlying near contact element 100 which also is mounted in the groove 91 and is secured in electrical engagement with contact element 93 by screw 102 which extends through elongated aperture 104 of contact element 100. An electrical lead 106 is connected to the screw 102 to provide an electrical circuit with a bi-stable relay (not shown) associated with the control 5 to de-energize the electrical circuit for the series-connected light fixtures 6 and 7 whenever the cable 76 of the switch 60 of either light fixture 6 or 7 engages front or rear contact elements 93, 100. Once the bi-stable relay is tripped, it can be reset only after a physical examination and adjustment of the light fixture and the manual closure of the switch.

With the downwind light fixture 6 and the upwind light fixture 7 installed along the runway, the light beam emerging from the apertures 8 and 9 thereof are set at the proper slope angle with the downwind unit set at, say, 4° slope and the upwind fixture set with its light beam at, say, 4.5° slope. With the light fixtures 6 and 7 so adjusted and the adjusting screws 34 locked in place, the respective tilt switch assemblies thereof are adjusted so that the stranded cable 76 engages the forward contact 93 if the light fixture should shift downward by, say, 24' to 30' or shift upward by, say, 45' to 1° from the desired slope angle of the light beams. Bolts 64 and 66 are tightened and locked to complete the adjustment of the system.

As indicated above, the light fixtures 6 and 7 may be subjected to severe buffetting by air blasts from airplanes using the runway and must be able to withstand buffetting which causes a vibration of one-half inch double amplitude at a frequency range of one-half to 10 hertz. It is therefore essential that switch 60 be insensitive to such buffetting and yet be sensitive to any permanent misadjustment of less than one-half degree.

With a cable 76 which is approximately 6 inches long, a ½° tilt of the light fixture corresponds to a distance of about 50 mils at contacts 93,100. Thus, the requirements for a satisfactory switch are such that it must be able to withstand vibrations having a double amplitude of about 10 times the permanent misadjustment which will cause engagement of cable 76 and contact 93 or contact 100.

A specific design which has proven to be satisfactory is one wherein the cylindrical pendulum 72 has a diameter of about 2 ¼ inches a length of 2 11/16 inches, and weighs 3 pounds. The cup has a diameter of 2 ¾ inches to provide an annulus between the cup and the pendulum 72 of ¼ inch which provides a ratio of pendulum diameter to annulus width substantially greater than 6 to 1, or of the order of about 10 to 1. A viscous fluid having a comparatively stable viscosity over a wide temperature range is placed in the cup to submerge the pendulum. By virtue of the relation of wetted perimeter and the width of the restricted orifice provided by the annulus between the pendulum and cup, the viscous fluid will provide a damping effect due to the shear loss and viscous drag on the flow of the fluid around the annulus and thereby resist the rapid movement of the pendulum as a result of vibrations due to buffetting to prevent engagement between the cable 76 and the contacts 93,100 while permitting slow movement of the pendulum 76 if the light fixture suffers a tilt of one-half degree for a period of, say 5 seconds duration or more. A silicon fluid, such as a 50/50 mixture of General Electric Viscasil 1000 and General Electric Viscasil 5000, in which the pendulum 72 is submerged has been found to be satisfactory. Such a design is jolt and vibration insensitive while retaining sensitivity to any permanent tilt of the light fixture which would adversely effect the failsafe reliability of the system in providing a signal in which the pilot can have complete confidence in his visual approach to the runway.

From the foregoing, it is apparent that this invention provides a unique inexpensive and failsafe runway glide path guidance system which will operate under all temperature conditions and in which a pilot can have complete confidence.

As will be apparent to persons skilled in the art, various modifications, adaptations and variations of the foregoing specific disclosure can be made without departing from the teachings of the present invention.

We claim:

1. An optical failsafe airplane landing guidance system comprising a pair of light beam generators, said generators being connected in series circuit relationship and displaced relative to each other along a runway to define a safe landing corridor therebetween, said generators comprising a light source and a means for emitting a light beam pointed at a preselected acute angle upwardly from and parallel to the runway to define the vertical boundaries of said safe landing corridor, and means associated with each light beam generator to disable said system when either of said light beams deviates from the preselected acute angle therefor.

2. The guidance system of claim 1 wherein said disabling means comprises a pendulum supported by a cable and a contact element cooperative therewith to form a switch connected to control the power delivered to said light beam generators, said pendulum being cylindrical and positioned in a cup to define an annulus therewith and a viscus fluid filling said annulus and submerging said pendulum.

3. The system of claim 2 wherein the ratio of the diameter of the pendulum to the width of the annulus is of the order of about 10 to 1.

4. The system of claim 1 wherein the upwind light beam generator is pointed at a greater angle upwardly with respect to the runway than is the downstream light beam generator.

5. The device of claim 2 wherein the switch operates a bi-stable relay in the electrical control circuit for said generator.

6. The system of claim 2 including means for adjusting the angular position of the switch relative to the axis of the light beam.

7. The system of claim 1 wherein the power circuit for said light beam generators includes a photocell actuated control for controlling the level of light output of said light beam generator.

8. The system of claim 1 wherein each light beam generator includes a filter to produce different colors of light above and below the central portion of the light beam.

9. For use in an optical failsafe airplane landing guidance system including a pair of lights displaced relative to each other along a runway and emitting a light beam pointed at a preselected acute angle upwardly from and parallel to said runway to define a safe landing corridor therebetween, a support for each of said lights mounting a switch comprising a pendulum supported by a cable and a contact element cooperative therewith to form a switch, said switch being closed when said support deviates to shift the associated light beam from its preselected position by a predetermined amount, the improvement wherein said pendulum is cylindrical and positioned in a cup to define an annulus therewith, a viscous fluid fills said annulus and submerges said pendulum, and the ratio of the diameter of the pendulum to the width of the annulus is substantially greater than 6 to 1.

10. The device of claim 9 wherein the liquid has a viscosity sufficient to render the switch insensitive to vibrations having a double amplitude of about 10 times the amount of permanent deviation required to actuate the switch.

11. The device of claim 10 wherein the cable is a stranded conductor.

12. A vibration insensitive switch suited for use in an optical failsafe airplane landing guidance system including a pair of lights displaced relative to each other along a runway and emitting light beams pointed at preselected acute angles upwardly from and parallel to a runway to define a safe landing corridor therebetween comprising a cylindrical pendulum supported by a cable, a contact element cooperative therewith to form a switch, said pendulum being positioned in a cup to define an annulus therewith, a viscous fluid in said annulus and submerging said pendulum, the ratio of the diameter of the pendulum to the width of said annulus being of the order of about 10 to 1.

* * * * *